United States Patent
Decker et al.

(10) Patent No.: US 7,039,800 B1
(45) Date of Patent: May 2, 2006

(54) TRANSLATOR TERMINAL FOR TWO OR MORE WIRELESS NETWORKS

(75) Inventors: David H. Decker, Marion, IA (US); Gerald W. Egeberg, Cedar Rapids, IA (US); James F. English, Cedar Rapids, IA (US); Gene S. Parker, Cedar Rapids, IA (US); Scott J. F. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/317,766

(22) Filed: May 24, 1999

(51) Int. Cl.
*H04L 9/00* (2006.01)

(52) U.S. Cl. ............ 713/150; 713/154; 380/255; 380/270

(58) Field of Classification Search .......... 713/154, 713/188–189, 164, 166, 150, 200–201; 709/223, 709/224; 380/255, 270
See application file for complete search history.

(56) References Cited

U.S. PATENT DOCUMENTS

| | | | | |
|---|---|---|---|---|
| 4,870,571 A | * | 9/1989 | Frink | 709/224 |
| 5,864,683 A | * | 1/1999 | Boebert et al. | 709/249 |
| 6,047,325 A | * | 4/2000 | Jain et al. | 709/227 |
| 6,178,512 B1 | * | 1/2001 | Fifield | 713/201 |
| 6,198,751 B1 | * | 3/2001 | Dorsey et al. | 370/466 |
| 6,393,568 B1 | * | 5/2002 | Ranger et al. | 713/188 |
| 6,487,657 B1 | * | 11/2002 | Brockmann | 713/154 |
| 6,597,671 B1 | * | 7/2003 | Ahmadi et al. | 370/329 |

* cited by examiner

*Primary Examiner*—Hosuk Song
(74) *Attorney, Agent, or Firm*—Nathan O. Jensen; Kyle Eppele

(57) ABSTRACT

A translator terminal for use with two or more wireless networks is disclosed. The translator terminal allows a first network to communicates with first-type terminals in an encrypted form and a second network to communicate with second terminals in an encrypted form. The translator terminal allows information from the first terminal to be translated to the second terminals, without jeopardizing the encryption format utilized by the first terminals. The translator could be utilized to translate selected information from a Link 16 network to another network.

17 Claims, 2 Drawing Sheets

TRANSLATOR TERMINAL FOR TWO OR MORE WIRELESS NETWORKS

FIELD OF THE INVENTION

The present invention relates to communication networks. More particularly, the present invention relates to wireless or spread-spectrum communication networks for communicating secured data.

BACKGROUND OF THE INVENTION

Wireless communication systems generally are utilized to transfer information in the form of radio frequency (RF) signals between terminals or receiver/transmitter units. The terminals can be arranged in a wireless network where terminals communicate information with each other.

Generally, the proprietor or entity which controls the network, as well as the users of the terminals, does not wish anyone else to receive information transmitted across the wireless network. Therefore, the data or information is usually encrypted in accordance with a secret encryption scheme so only users to whom the terminals have been given are allowed to receive the information (e.g., a secure network). The terminals typically have decryption capabilities.

In certain communication systems and applications, communication between a first wireless network and a second wireless network may be desirable. The first wireless network can be a secure network which utilizes a first encryption scheme to transfer data among first terminals. The second wireless network can be a secure network or a non-secure network that allows communication among second terminals. If the second network is a secure network, data is transmitted in accordance with a second encryption scheme.

Generally, the terminals of the first network cannot transmit information to terminals of the second network. Therefore, information in the first network cannot be transmitted to the second network without providing the first encryption scheme or hardware for receiving the data from the first network to the proprietor or controller of the second network. However, providing such information or such a device to the controller of the second network can jeopardize the security of the first network during and after the exchange of information between the first and second network.

For example, the United States government and its military forces often utilize a Link 16 wireless network to communicate data or information among Link 16 terminals. The information can include tactical, positioning, navigational, and other information utilized by military intelligence and other government institutions. Link 16 transmitters and receivers (i.e., terminals) can be mounted on a variety of platforms, including aircraft, naval ships, or even backpack worn by army personnel.

In general, the information in a Link 16 network is transmitted across the airwaves via radio signals (e.g., at frequencies of 969 to 1206 megahertz), which are encrypted on 51 different channels so only users who possess Link 16 terminals can receive the information. The information can be sensitive information, such as, a tactical picture of battlefield conditions, identification of friends and foes, voice communication, or navigational information. The National Security Agency (NSA) tightly regulates the sale and use of terminals or devices capable of operating with a Link 16 network. Generally, the NSA requires that Link 16 terminals be controlled by U.S. forces or very close allies of the United States to protect encryption techniques utilized in Link 16 networks.

Nonetheless, certain foreign countries or other entities require the use of a secure wireless or spread spectrum network for communicating information similar to information communicated on the Link 16 network. In times of international cooperation, the United States government would like to be able to exchange tactical information with certain countries utilizing a second type of network. To make this possible, the United States government would have to supply encryption devices capable of translating the Link 16 information to the certain countries. Supplying such devices to powers outside of direct United States government control jeopardizes the security of the Link 16 network and, therefore, the NSA does not approve of this action.

Another possible solution involves Link 16-like terminals having a country-unique encryption device. The country-unique encryption device or terminal could be reconfigured (e.g., by programming or by changing hardware when interoperability within Link 16 terminals is required). This solution has four major problems: 1). The solution requires a major force-wide maintenance operation at a time of potential international crises; 2). It potentially allows a foreign entity complete access to all United States data and Link 16 data when it may be only desirable to exchange some of the tactical data on the Link 16 network; 3) It would allow foreign governments to be able to analyze the modification, thereby reverse engineering the device to obtain constant Link 16 capability; 4) It anticipates that it would require that the United States would be willing to supply encryption devices during times of international cooperation and crisis.

Thus, there is a need for an apparatus for and a method of integrating two or more wireless networks. Further, there is a need for a simple method of allowing foreign governments limited access to Link 16 information. Further still, there is a need for a Link 16-link network that can access Link 16 information under control of the United States government.

SUMMARY OF THE INVENTION

The present invention relates to a translator for use with a first wireless network and a second wireless network. The first wireless network includes first terminals communicating in a first encrypted format. The second wireless network includes second terminals communicating in a second encrypted format or in a non-encrypted format. The translator communicates with the first terminals in the first encrypted format and communicates with the second terminals in the second encrypted format or in the non-encrypted format. The translator communicates selected information from the first network to the second network.

The present invention further relates to a method of communicating in a communication network. The communication network includes a first secure wireless network and a second secure wireless network. The first secure wireless network includes first terminals and the second secure wireless network includes second terminals. The method includes communicating data among the first terminals in a first format, communicating data among the second terminals in a second format, translating selected data in the first format to translated data in the second format, and communicating the translated data to the second terminals.

The present invention even further relates to a communication system including a first means for communicating radio signals in a first encrypted format, a second means for communicating radio signals in a second encrypted format or in a non-encrypted format, and a translator means for communicating with the first means in the first encrypted format and for communicating with the second means in the second format or in a non-encrypted format. The translator means communicates selected data from the first means to the second means.

BRIEF DESCRIPTION OF THE DRAWINGS

Exemplary embodiments of the present invention are described below with reference to the accompanying drawings, wherein like numerals denote like elements, and.

DETAILED DESCRIPTION OF THE PREFERRED EMBODIMENTS

Figure 1:
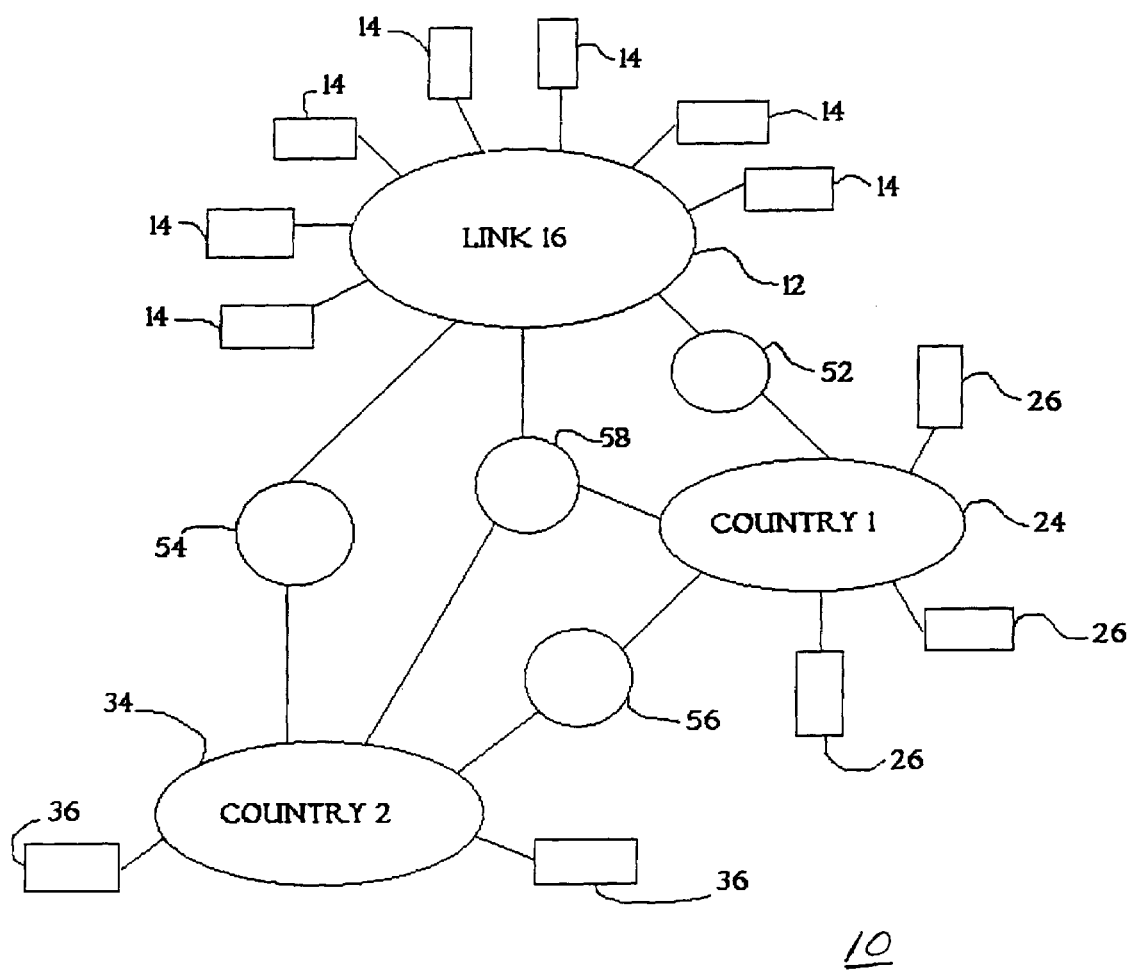
FIG. 1 is a block diagram showing a communication system including a first network and a second network in accordance with an exemplary embodiment of the present invention.

With reference to FIG. 1, a communication system 10 includes a wireless network 12 and a wireless network 24. Wireless network 12 includes terminals 14. Terminals 14 communicate with each other via radio signals. The radio signals are encrypted. Communication system 10 preferably includes a Link 16 secured network. Alternatively, system 10 can be any type of spread spectrum communication system.

Preferably, wireless network 12 is a Link 16 wireless network and terminals 14 are Link 16 terminals (e.g., transmitter/receiver unit). Link 16 is a spread spectrum tactical data link used by the United States military. Terminals 14 can transmit tactical, positioning, and navigational information in an encrypted format.

Wireless communication network 24 includes terminals 26. Terminals 26 communicate radio signals in a non-encrypted or in an encrypted format. Preferably, the format utilized by terminals 14 is different than the format utilized by terminals 26. Terminals 26 are preferably Link-16 like terminals which do not have the same special U.S. encryption capabilities. Terminals 26 can be Link 16 terminals which are modified to have a country unique cryptological ability.

Terminals 14 preferably transmit on fifty-one channels in a frequency range of 969 to 1212 mHz, which is typical for Link 16 networks. Generally, network 24 can operate at a different frequency range or have a different code than network 12 to avoid interference with network 12. Terminals 14 can include an NSA-controlled device called a Comsec/Transec Integrated Circuit (CTIC), more particularly, CTIC/DS-101 Hybrid (CDH). Preferably, network 24 communicates in an unencrypted format or a country-unique encrypted format. The term country-unique can refer to any entity or treaty organization. For example, the North Atlantic Treaty Organization (NATO), or a single country, such as, Germany, Taiwan, or Singapore can have its unique country code.

Optionally, communication system 10 can include a third network, such as, network 34. Network 34 is a wireless network including terminals 36. Terminals 36 communicate radio signals in a non-encrypted or in an encrypted format. Terminals 36 are similar to terminals 26 in network 24. To avoid interference, terminals 36 preferably do not communicate in the same frequency range or communicate the same code as networks 12 and 24 to avoid interference. A time division multiplexing technique can also be utilized to prevent interference among networks 12, 24, and 36.

Communication system 10 advantageously includes translators 52, 54, 56, and 58. Generally, terminals 14, 26, and 36 cannot transmit data or information between each other without the use of translators 52, 54, and 58. In this way, networks 12, 24, and 34 operate or communicate independently from each other.

Translator 52 allows communication between network 24 and network 12; translator 52 allows terminals 26 to communicate with terminals 14. Translator 52 translates information communicated by one or more of terminals 14 and provides the translated information in the format of network 24 for use by terminals 26. Translator 52 also translates information communicated by one or more of terminals 26 and provides the translated information in the format of network 12 for use by terminals 14.

Translator 52 is programmable or configurable to only provide certain types of information from network 12 to network 24. Generally, translator 52 only provides selected information from network 12 to network 24. Additionally, translator 52 can provide all of, or only some of, the information from network 24 to network 12. Translator 52 can include a message filter, which ensures that only selected information is transmitted from terminals 14 to terminals 26 and from terminals 26 to terminals 14.

Generally, translator 52 is programmed to relay all desired information between network 12 and network 24. Mission planning ensures that only appropriate information is relayed between networks 12 and 24.

In accordance with an exemplary embodiment of the present invention, the United States government (e.g., army, navy, airforce, or a combination thereof) can retain control of all Link 16 cryptological devices (terminals 14 and translator 52 are kept in its possession) and yet be able to communicate all desired information with cooperating countries through networks 24 and 34. Additionally, translator 52 maintains the confidentiality of other information not desired to be communicated and the confidentiality of Link 16 encryptology.

Translator 54 is similar to translator 52 except that translator 54 allows terminals 14 to communicate with terminal 36. Similarly, translator 56 is similar to translator 52 and 54, except translator 56 allows terminals 26 to communicate with terminals 36. In such a case, translator 56 could be held by a neutral ally of the country associated with network 24 and the country associated with network 34 or by both countries or by a single one of the countries associated with network 24.

Translator 58 is similar to translators 52, 54, and 56, except translator 58 allows communication between three networks, network 12, network 24, and network 34. Translator 58 is configured to provide desired information from network 12 to networks 34 and networks 24. Similarly, translator 58 allows transmission of information from networks 24 and 34 to network 12. Translator 58 can also allow communication between networks 24 and 34.

Figure 2:
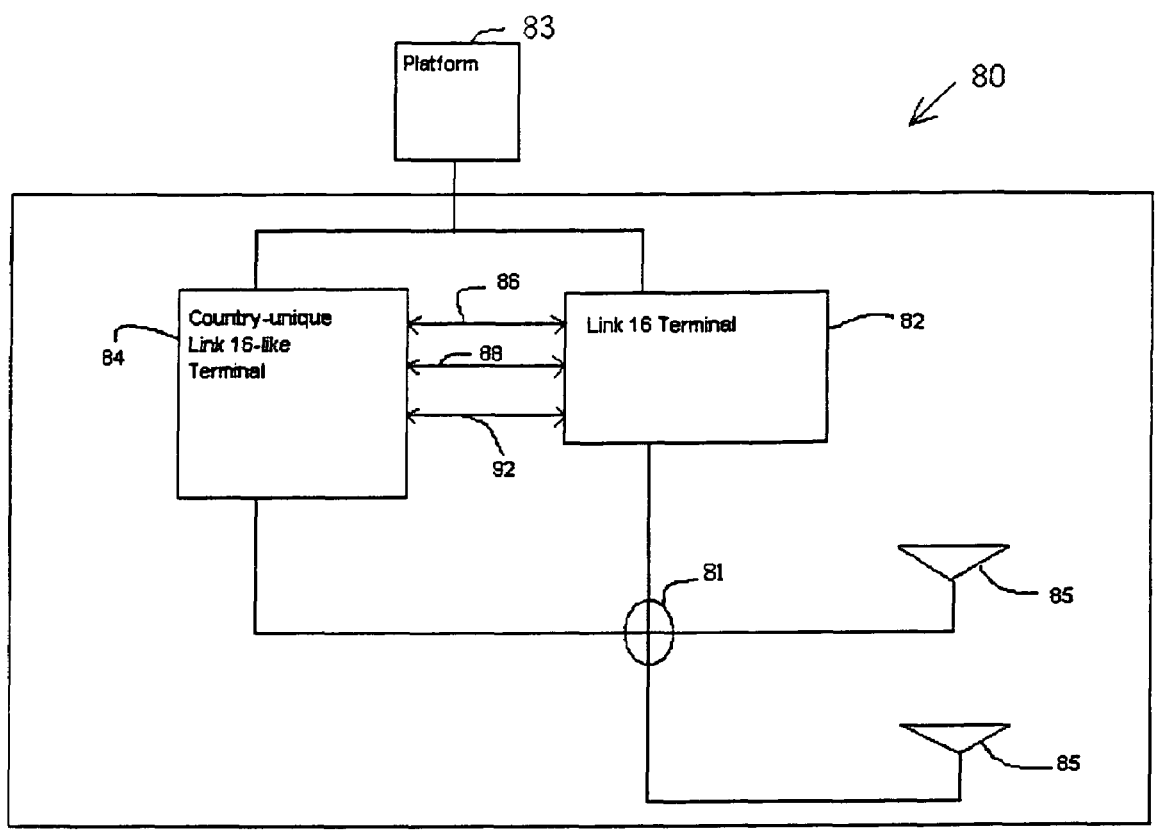
FIG. 2 is a block diagram of a translator in accordance with another exemplary embodiment of the present invention.

With reference to FIG. 2, a translator 80 can be utilized as any of translators 52, 54, 56, or 58. Preferably, translator 80 is provided on an optional platform 83. Platform 83 can be a land-based platform, a space-based platform, a naval-based platform, or an air-base platform. Translator 80 includes one or more antennas 85, a terminal 82 with encryption capabilities in a first format, and a terminal 84 with encryption capabilities in a second format or having no encryption capabilities. If only one antenna 85 is utilized, a time division circuit 81 ensures appropriate sharing of the single antenna.

Terminal 82 can be similar to terminal 14 (e.g., a Link 16 terminal). Terminal 84 can be similar to terminals 36 or 26. Terminal 82 is coupled to terminal 84 by a high-speed or fast rate-data link 86, a blanking interface 88, and a timing interface 92. Blanking interface 88 allows terminals 82 and 84 to share the communication medium without interrupting each other.

Translator 80 can be placed in a cargo plane, AWACS plane, or other aircraft and flown over the field of interest to provide translation for terminals 14, terminals 26, and terminals 36 (FIG. 1). In such a case, translator 80 and information about terminal 82 (the Link 16 terminal) of translator 80 are advantageously kept in United States possession at all times and secured information is not provided to non-United States personnel. In addition, terminal platform 83 can be in an embassy building or other United States-controlled installation. Translator 80 can be designed to be deployed on rack for easy movement and placement.

Translator 80 can be modified for use as translator 58 by including a third terminal. The third terminal would share an interface with terminal 82 and terminal 84.

Translator 80 advantageously allows foreign governments to utilize a wireless network, such as, networks 24 and 34, which can be easily integrated into a Link 16 network without jeopardizing control of Link 16 terminals. For example, translator 80 can be flown to an embassy or a Untied States base in the area of operation and, through translator 80, networks 12 and 24 can be easily integrated. In addition, translator 80 can be programmed to provide selective transmission of data between networks 24 and 34. Further still, terminals 26 can be designed so that they cannot be converted to Link 16 type terminals. Therefore, the United States government can remain in control of all Link 16 terminals and yet allow some foreign governments to have some of the many advantages of wireless networks. Even further still, terminals 26 should not be easily converted to Link 16-types of terminals by changing a single chip or single programming module. In addition, no maintenance is required to terminals 26 or 36 to allow operation with network 12.

It is understood that, while preferred embodiments, examples, materials, and values are given, they are for the purpose of illustration only. The apparatus and method of the invention are not limited to the precise details and conditions disclosed. For example, although Link 16 terminals are utilized, other types of wireless networks could be utilized. Thus, changes may be made to the details disclosed without departing from the spirit of the invention, which is defined by the following claims.

The invention claimed is:

1. A translator for use with a first wireless network, a second wireless network and a third wireless network, the first wireless network including first terminals communicating in a first encrypted format, the second wireless network including second terminals communicating in a second encrypted format or in a non-encrypted format, and the third wireless network including third terminals communicating in a third encrypted format, the translator including a first translator terminal communicating with the first terminals in the first encrypted format, the translator including a second translator terminal communicating with the second terminals in the second encrypted format or in the non-encrypted format and the translator including a third translator terminal communicating with the third terminals in the third encrypted format, the first translator terminal in data communication with the second translator terminal, the translator communicating first selected information between the first network and the second network and the translator communicating second selected information from the first network to the third network.

2. The translator of claim 1, wherein the translator includes a message filter for allowing the first selected information to be communicated from the first network to the second network.

3. The translator of claim 1, wherein the translator includes a message filter for allowing the first selected information to be communicated from the first network to the second network, the message filter being programmable.

4. The translator of claim 3, wherein the message filter includes a software module, the software module preventing sensitive information from being communicated from the first network to the second network.

5. The translator of claim 1, wherein the first terminals are secure Link 16 terminals.

6. The translator of claim 5, wherein the second terminals are spread spectrum tactical data terminals having country unique encryption.

7. A method of communicating in a communication network, the communication network including a first secure wireless network, a second secure wireless network, and a third wireless network, the first secure wireless network including first terminals, the second secure wireless network including second terminals and the third wireless network including third terminals, the method comprising:
communicating data among the first terminals in a first format;
communicating data among the second terminals in a second format;
communicating among the third terminals in a third format;
translating first selected data in the first format to first translated data in the second format using a translator having a first translator terminal communicating with the first terminals in the first format and a second translator terminal communicating with the second terminals in the second format, the first translator terminal in data communication with the second translator terminal;
communicating the translated data to the second terminals;
translating second selected data in the first format to second translated data in the third format, the translator having a third translator terminal communicating with the third terminals in the third format; and
communicating the second selected data to the third terminals.

8. The method of claim 7, wherein the first terminals are secure Link 16 terminals.

9. The method of claim 8, wherein the second terminals are spread spectrum tactical data terminals having country unique encryption.

10. The method of claim 7 further comprising:
translating the data in the second format to the data in the first format; and
communicating the translated data among the first terminals.

11. The method of claim 10, wherein the translating step is performed by a translator under control of a United States organization.

12. The method of claim 7, wherein the first terminals are under control of a first entity, and the second terminals are under control of a second entity, and the translating step is under control of the first entity.

13. A communication system comprising:
- a first means for communicating radio signals in a first encrypted format;
- a second means for communicating radio signals in a second encrypted format or in a non-encrypted format;
- third means for communicating radio signals in a third format; and
- a translator means including a first translator terminal for communicating with the first means in the first encrypted format, a second translator terminal for communicating with the second means in the second encrypted format or in a non-encrypted format, and a third translator terminal for communicating with the third means in the third format, the first translator terminal in data communication with the second translator terminal, the translator means communicating selected data between the first means and the second means, and wherein the translator means communicates selected data from the first means to the third means.

14. The communication system of claim 13, wherein the first means are Link 16 terminals.

15. The communication system of claim 14, wherein the translator means operates from a platform under United States government control.

16. The communication system of claim 15, wherein the translator means is located in an aircraft.

17. The communication system of claim 13 further comprising:
- second translator means for communicating with the first means in the first encrypted format and for communicating with the third terminals in the third format, the second translator means communicating second selected data from the first means to the third means.

* * * * *